Patented Aug. 18, 1931

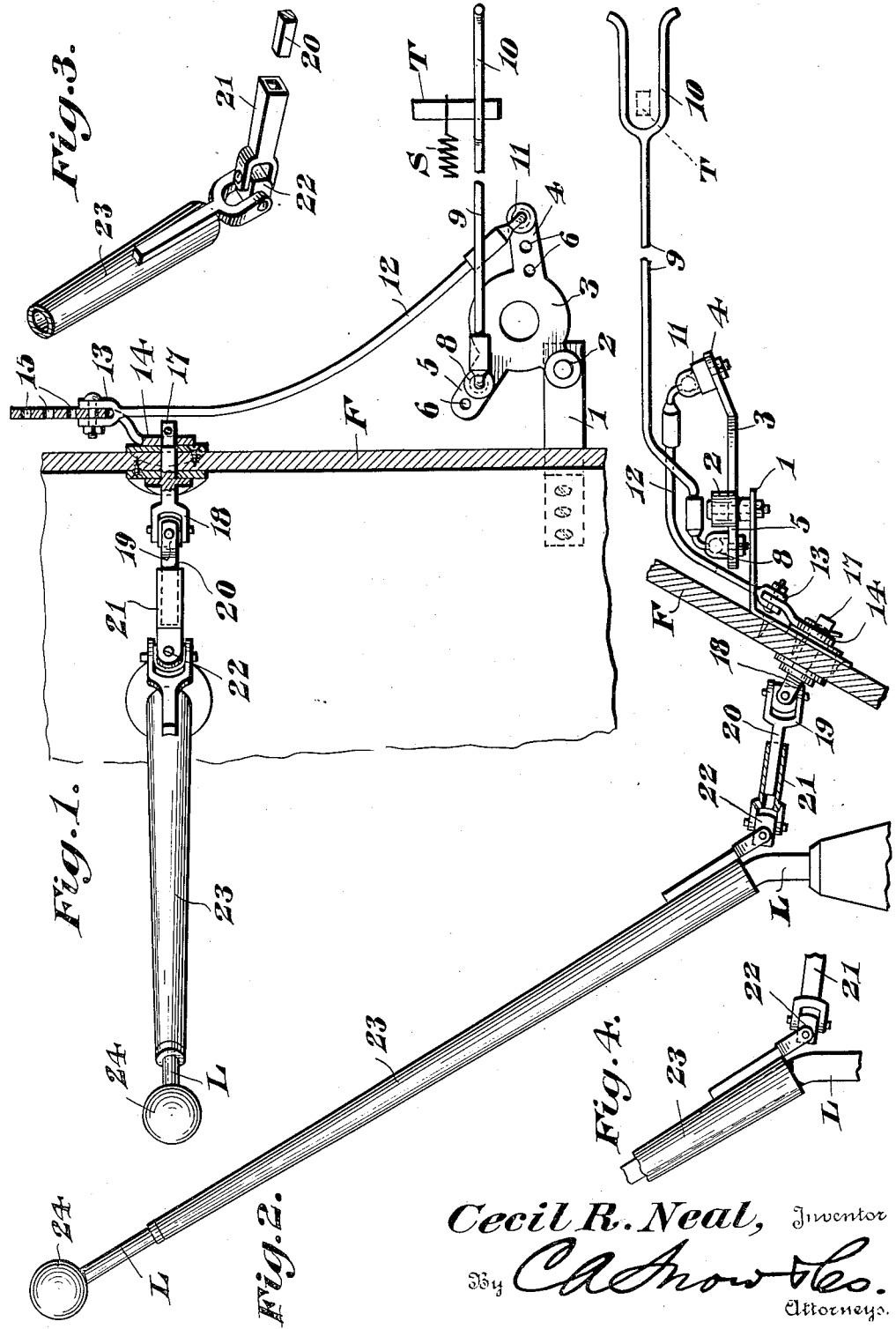

1,819,111

UNITED STATES PATENT OFFICE

CECIL ROBERT NEAL, OF PORTLAND, OREGON

GAS THROTTLE

Application filed September 3, 1929. Serial No. 389,995.

This invention relates to a gas throttle for use in connection with motor vehicles, one of the objects being to provide a throttle which can be actuated by means of the gear shift handle whereby it is possible, with one hand, to shift the gears and at the same time actuate the throttle.

Another object is to provide a device of this character which will not interfere with the use of the foot pedal commonly provided, should it be desired to control the throttle by means thereof.

The foot pedal commonly employed for actuating the throttle is objectionable because it necessitates the constant shifting of the foot while driving through traffic or while following a slow line of cars. It is an object of the present invention to eliminate this objectionable feature by allowing the foot to stay on the brake pedal while the throttle can be controlled by the hand actuating the gear shift lever.

With the foregoing and other objects in view which will appear as the description proceeds, the invention resides in the combination and arangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings,

Figure 1 is a plan view of the structure constituting the present invention, a portion of the floor board being shown and some of the parts being broken away.

Figure 2 is a side elevation of the structure.

Figure 3 is a perspective view of that portion of the structure adapted to engage the gear shift lever, a portion of the lever engaging sleeve being broken away.

Figure 4 is an elevation of a portion of the gear shift lever showing the sleeve and adjacent parts thereon.

Referring to the figures by characters of reference, 1 designates a bracket adapted to be secured to the bottom of the inclined floor board of a vehicle, this board being indicated at F. The bracket has an arm 2 on which is pivotally mounted a bell crank 3 the diverging arms of which have been indicated at 4 and 5 respectively. Each of these arms has a longitudinal series of apertures 6. Arm 4 is extended horizontally.

Adjustably connected to the arm 5 is the socket member 8 of a universal joint, this socket member being adapted to be secured in any one of the apertures 6 in the arm 5. The other member of the universal joint is provided at one end of a rod 9 the other end of which is forked as shown at 10 so as to straddle the arm T of the throttle, not shown, said arm being normally retracted toward bracket 1 by a spring S.

Attached to the arm 4 in any one of the apertures 6 is the socket member 11 of a universal joint, the other member of this joint being provided at one end of a rod 12. This rod is extended laterally and has a fork 13 pivotally connected to a crank arm 14 which, as indicated in Figure 1, is provided with a longitudinal series of apertures 15 any one of which is adapted to receive the pivot bolt 16 that connects the fork 13 to the crank arm 14.

The crank arm 14 is extended from the lower end of a stem 17 rotatably mounted in the floor board F and provided, at its upper end, with a forked head 18. This head is connected by a universal joint 19 of any suitable construction to one end of an angular rod 20 the other end of which is telescopically connected to a tubular member 21 having a universal connection at 22 with the lower portion of a sleeve 23. This telescopic connection made up of the members 20 and 21 is extended radially from the stem 17 and the sleeve 23 is mounted on and adapted to be rotated upon the gear shift lever L ordinarily provided. A knob 24 is located at the upper end of the sleeve and by means thereof the gear shift lever can be moved in the usual way and, if desired, the sleeve 23 can be rotated on the lever.

In practice the gear shift lever is actuated in the usual way and, when it is desired to actuate the throttle, the driver merely turns the knob 24 to the right or to the left. This will result in rotating sleeve 23 on the gear shift lever L and motion will therefore be transmitted through the universal connection 22 to the telescopic connection 20—21 which will cause stem 17 to turn to the right or to the left. This, as a result of the action described, will transmit motion through the crank arm 14 to rod 12 and thence through the bell crank 3 to rod 9 causing the fork 10 to press against lever T or to release said lever to allow its actuation by spring S.

By providing the fork 10 for actuating lever T, the normal actuation of said lever by the foot pedal will not be interfered with.

What is claimed is:

1. In a motor vehicle the combination with a throttle lever and a gear shift lever, of a rotatable stem, a member rotatable on the gear shift lever, means actuated by said member when rotated on the lever for rotating the stem, and means for transmitting motion from said stem to the throttle lever, said means including a lever having two arms, an arm movable with the stem, an operative connection between the arm and one arm of said lever, and an operative connection between the other arm of the said lever and the throttle.

2. In a motor vehicle the combination with a throttle lever and a gear shift lever, of a rotatable stem, a member rotatable on the gear shift lever, means actuated by said member when rotated on the lever for rotating the stem, and means for transmitting motion from said stem to the throttle lever, said means including a bell crank, an arm movable with the stem, an operative connection between the arm and one arm of the bell crank, and an operative connection between the other arm of the bell crank and the throttle lever, said last named connection including a fork loosely embracing the throttle lever.

3. In a motor vehicle the combination with a throttle lever and a gear shift lever, of a rotatable stem, a member rotatable on the gear shift lever, means actuated by said member when rotated on the lever for rotating the stem, a lever, a thrust connection between said lever and the throttle lever, and means for transmitting thrusts to said lever from the stem when rotated, said thrust connections operating in different directions respectively.

In testimony that I claim the foregoing as my own, I have hereto affixed my signature.

CECIL ROBERT NEAL.